United States Patent [19]
Chung et al.

[11] Patent Number: 6,017,468
[45] Date of Patent: Jan. 25, 2000

[54] POLYMER DISPERSED LIQUID CRYSTAL MATERIALS POLYMER DISPERSED LIQUID CRYSTAL DISPLAY DEVICES AND METHOD OF MANUFACTURING THE SAME

[75] Inventors: David B. Chung, Cupertino, Calif.; Hideaki Tsuda, Kawasaki, Japan; Hidefumi Yoshida, Kawasaki, Japan; Kazutaka Hanaoka, Kawasaki, Japan; Kimiaki Nakamura, Kawasaki, Japan; Hideo Chida, Kawasaki, Japan

[73] Assignee: Fujitsu Limited, Kawasaki, Japan

[21] Appl. No.: 08/909,629

[22] Filed: Aug. 12, 1997

Related U.S. Application Data

[62] Division of application No. 08/529,970, Sep. 19, 1995, abandoned.

[30] Foreign Application Priority Data

Oct. 6, 1994 [JP] Japan .................................. 6-243008

[51] Int. Cl.⁷ ............................. C09K 19/54; G02F 1/13; G02F 1/1333; G02F 1/137
[52] U.S. Cl. ................................ 252/299.5; 252/299.01; 349/89; 349/90; 349/93
[58] Field of Search ........................... 252/299.01, 299.5; 428/1; 349/89, 90, 93

[56] References Cited

U.S. PATENT DOCUMENTS

| | | | |
|---|---|---|---|
| 4,950,052 | 8/1990 | Fergason et al. | 349/92 |
| 5,056,898 | 10/1991 | Ma et al. | 349/94 |
| 5,410,424 | 4/1995 | KonuMa et al. | 349/90 |
| 5,427,713 | 6/1995 | Wartenberg et al. | 252/299.5 |
| 5,585,947 | 12/1996 | Havens et al. | 349/92 |

FOREIGN PATENT DOCUMENTS

| | | |
|---|---|---|
| 4-60518 | 2/1992 | Japan . |
| 4-86724 | 3/1992 | Japan . |

OTHER PUBLICATIONS

James L. Fergason, SID 85 Digest pp. 68–70, 1985.
J. W. Doane et. al., Appl. Phys. Lett. 48(4), pp. 269–271, 1986.
T. Fujisawa et. al., Japan Display '89, pp. 690–693, 1989.
E. Shimada et al., Japan Display '92, pp. 699–693, 1992.
Paul S. Drzaic, Liquid Crystals, 1988. vol. 3, No. 11, pp. 1543–1559.
N. Yamada et. al., Japan Display '92, pp. 695–698, 1992.
J. De Baets et. al, Euro Display 1993, pp. 117–129.

*Primary Examiner*—Shean C. Wu
*Attorney, Agent, or Firm*—Armstrong, Westerman, Hattori, McLeland & Naughton

[57] ABSTRACT

A polymer dispersed liquid crystal material comprising a polymer matrix, a liquid crystal and a diffusing agent.

18 Claims, 13 Drawing Sheets

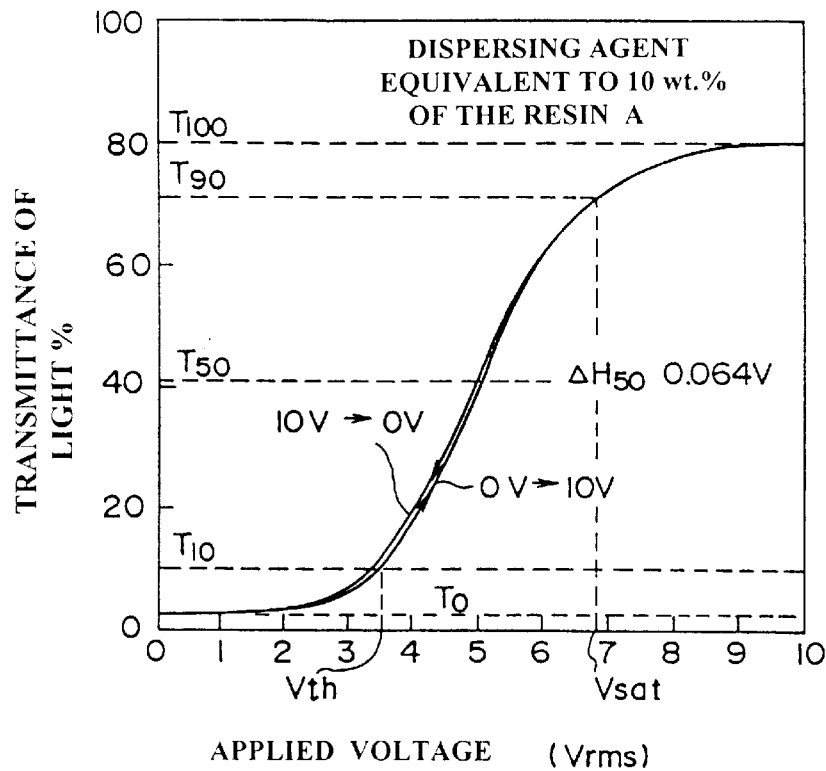
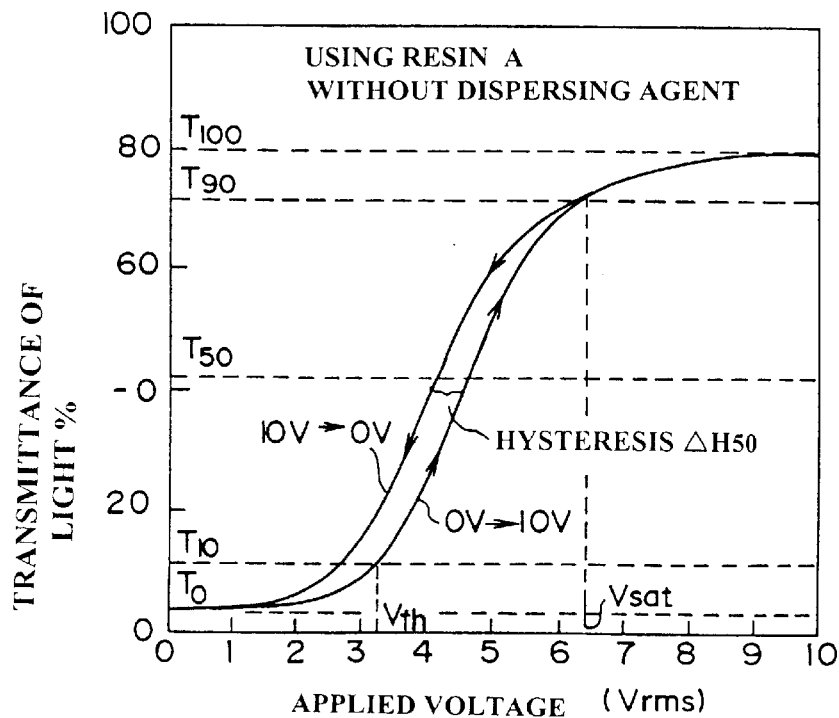

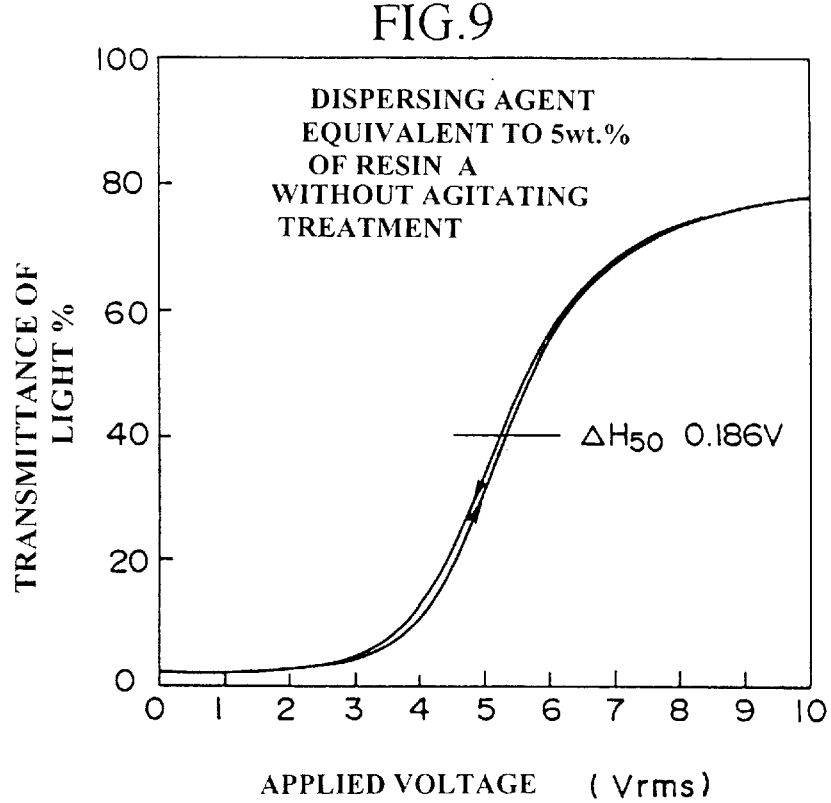
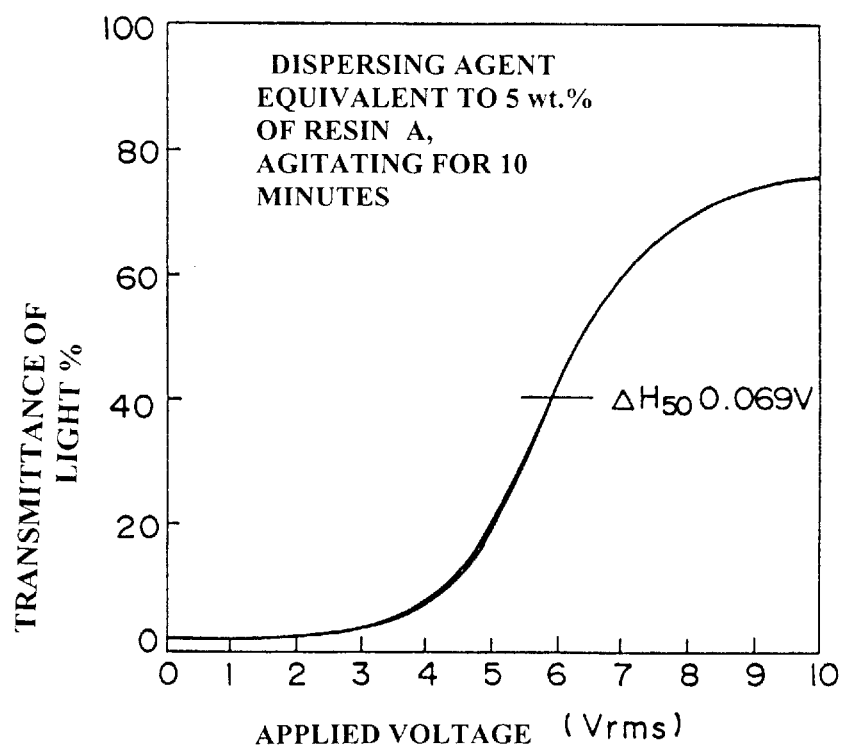

POLYMER DISPERSED LIQUID CRYSTAL MATERIALS POLYMER DISPERSED LIQUID CRYSTAL DISPLAY DEVICES AND METHOD OF MANUFACTURING THE SAME

This application is a divisional application of Ser. No. 08/529,970 filed Sep. 19, 1995, now abandoned.

BACKGROUND OF THE INVENTION

1. Field of the Invention

The present invention relates to a polymer dispersed liquid crystal material, a polymer dispersed liquid crystal display device and a method of manufacturing the same.

2. Description of the Prior Art

Liquid crystal display devices are excellent, as compared with other types of display, in terms of low power consumption, flatness and therefore portability so that many portable displays, projectors and the display devices of other electric appliance are formed therefrom. Among them, projection-type liquid crystal displays (projection-type LCDs) are particularly advantageous as compared with CRT (cathode ray tube) to realize wide screens with relatively small and light weight projector propers. Because of this, the study of application for the LCDs to projection televisions have been enhanced.

The projection-type LCDs are composed of a pair of polarizing plates between which is located a liquid crystal panel utilizing a twisted nematic liquid crystal material in order to modulate projected light in terms of intensity. However, a polarizing plate absorbs at least a half of incident light quantity passing therethrough so that the total transmittance is substantially decreased. The displayed image is therefore dimmed when the display panel is utilized in a well-lit room.

From this view point, there have been needs for a liquid crystal display panel having a high transmittance. The use of polymer dispersed liquid crystal materials was then proposed to realize a liquid crystal display panel having a high transmittance.

In such a polymer dispersed liquid crystal panel, the liquid crystal device is constructed as illustrated in FIGS. 1A and 1B.

The opposed inside surfaces of a first transparent substrate 101 and a second transparent substrate 102 are coated with transparent electrodes 103 and 104 in FIGS. 1A and 2A. Polymer dispersed liquid crystal layers 105 and 106 are disposed between these transparent electrodes. Namely, the polymer dispersed liquid crystal layer 105 as illustrated in FIG. 1A is composed of a polymer matrix 105a in which are embedded a number of micron-sized droplets of a nematic liquid crystal material 105b. On the other hand, the polymer dispersed liquid crystal layer 106 as illustrated in FIG. 2A is composed of a nematic liquid crystal matrix 106b in which are embedded a number of micron-sized particles of a polymer 106a. Another type of polymer dispersed liquid crystal panel is composed of a nematic liquid crystal material dispersed in a polymer matrix in the form of a network structure as described in [1] E. Simada, T. Uchida, JAPAN DISPLAY '92, pp. 699–702.

As illustrated in FIGS. 1A and 2A, the molecules of the nematic liquid crystal 105b and 106b are aligned at random in the absence of an electric field applied between the transparent electrodes 103 and 104 so that light rays passing therethrough are substantially scattered. In this case, there is a differential index of refraction at the boundary between the nematic liquid crystal 105b and 106b and the polymer matrix 105a and 106a to enhance the effect of scattering light rays.

Contrary to this, as shown in FIGS. 1B and 2B, when an electric field applied between the transparent electrodes 103 and 104, the molecules of the nematic liquid crystal 105b and 106b are directed normal to the transparent electrodes 103 and 104 in alignment with the electric field as illustrated in FIGS. 1B and 2B. The light rays are therefore passed therethrough without scattering since there is substantially no variation in the index of refraction either on the nematic liquid crystal 105b and 106b and the polymer matrices 105a and 106a. A polarizing plate is therefore not required in this structure so that the efficiency of making use of the incident light is substantially improved.

When the light transmittance of a polymer dispersed liquid crystal panel is plotted while the voltage thereacross as the abscissa is increased from a higher level to a lower level and decreased from the lower level to the higher level, there is observed a hysteresis effect since there are differences between the curves of the hysteresis loop illustrated when the voltage is increased and when the voltage is decreased as reported in [2] PAUL S. DRZAIC, LIQUID CRYSTALS, 1988, VOL.3, NO.11, pp. 1543–1559. The hysteresis causes afterimages to linger on and be burned into the screen of the panel.

Accordingly, when the polymer dispersed liquid crystal panel as described above is driven in the same manner as usual twisted nematic liquid crystal display, it is impossible to realize grayscale images and full color images.

In order to reduce the width of the hysteresis, it is proposed to add fluorinated acrylate monomer to a polymer dispersed liquid crystal material in [3] N. Yamada et al., JAPAN DISPLAY 1992, pp.695–698 and to modify the proportion of acrylate monomer in a polymer dispersed liquid crystal layer in [4] J. De Baets et al., EURO DISPLAY 1993, pp.117–120.

However, the conventional techniques including the above two examples for reducing the width of the hysteresis can not be applied to polymer dispersed liquid crystal panels utilizing usual liquid crystal layers and usual polymer matrices.

SUMMARY OF THE INVENTION

It is an object of the present invention to provide an improved liquid crystal material, an improved liquid crystal display device in which the voltage applied and the transmittance are improved and a method of manufacturing the same while the engineer arbitrarily selects necessary materials among from a variety of candidates.

In accordance with the present invention, a dispersing is added to the premixture of a liquid crystal and a polymer matrix. The dispersing agent functions to intervene between the liquid crystal and the polymer matrix to lessen the interaction therebetween making it easy to control the direction of the liquid crystal molecules by varying the voltage applied the liquid crystal.

Accordingly, it is possible to reduce the hysteresis effect as represented by separated curves of the hysteresis loop showing the relationship between the transmittance and the voltage applied to the liquid crystal panel having the polymer dispersed liquid crystal to which a dispersing agent is added. This advantage has been confirmed by experiments. In this case, it has been also confirmed that the elevating curve and the descending curve of the hysteresis loop approach to each other by adding a dispersing agent irrespective of the kinds of the liquid crystal and the polymer matrix. The distance of the separated curves of the hysteresis loop (the width of the hysteresis loop) can be decreased by increasing the amount of the dispersing agent added to the mixture. However, the temperature of phase separation is elevated as the amount of the dispersing agent added to the mixture is increased. The amount of the dispersing agent is preferably not higher than 30 wt % of the amount of the polymer matrix.

The premixture containing the dispersing agent is disposed between a pair of substrates and exposed to illumination to cause phase separation by photo-polymerization in order to cause the liquid crystal dispersed in the polymer matrix in the form of a number of approximately spherical particles or cause the polymer matrix dispersed in the liquid crystal in the form of a number of fine particles or in the form of a network structure.

It has been confirmed that the width of the hysteresis loop can be furthermore reduced by agitating the dispersing agent, the liquid crystal and the polymer matrix by vibration in advance of curing the polymer matrix.

When the frame for sealing the polymer matrix type liquid crystal layer is made of a ultraviolet-curing resin as well as the polymer matrix, the frame and the polymer matrix can be cured at the same time so that the procedure is simplified. Also, in the case that the frame of a sealing material preventing the loss of the polymer dispersed liquid crystal is provided with openings for filling the inside of the frame with the polymer dispersed liquid crystal, the cleaning and the agitation by vibration can be freely carried out after closing the openings with a visible light curable sealing member and curing the sealing member by visible light.

Meanwhile, the dispersing agent is a nonaqueous dispersing agent, for example, a polymer dispersing agent and a cationic dispersing agent.

BRIEF DESCRIPTION OF THE DRAWINGS

FIG. 7 is a graphic diagram showing a first example of the relationship between the transmittance and the applied voltage in the case of a polymer dispersed liquid crystal display panel utilizing a dispersing agent.

FIG. 8 is a graphic diagram showing a first example of the relationship between the transmittance and the applied voltage in the case of a conventional polymer dispersed liquid crystal display panel in which no dispersing agent is utilized.

FIG. 9 is a graphic diagram showing a first example of the relationship between the transmittance of the liquid crystal panel and the applied voltage thereof in the case that a premixture of a resin and a liquid crystal with an additive of a dispersing agent is not agitated.

FIG. 10 is a graphic diagram showing a first example of the relationship between the transmittance of the liquid crystal panel and the applied voltage thereof in the case that a premixture of a resin and a liquid crystal with an additive of a dispersing agent is agitated.

DETAILED DESCRIPTION OF THE PREFERRED EMBODIMENTS

Figure 1A:
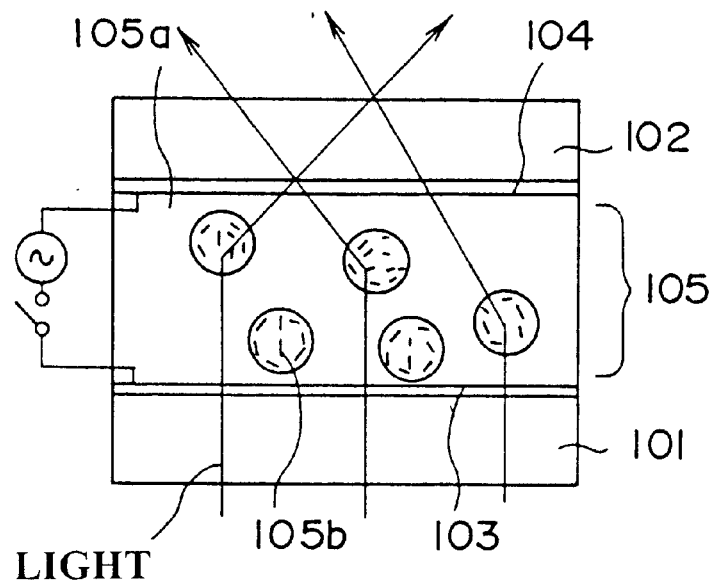
FIGS. 1A and 1B are cross sectional views showing the structures of a prior art liquid crystal display panels.
Figure 1B:
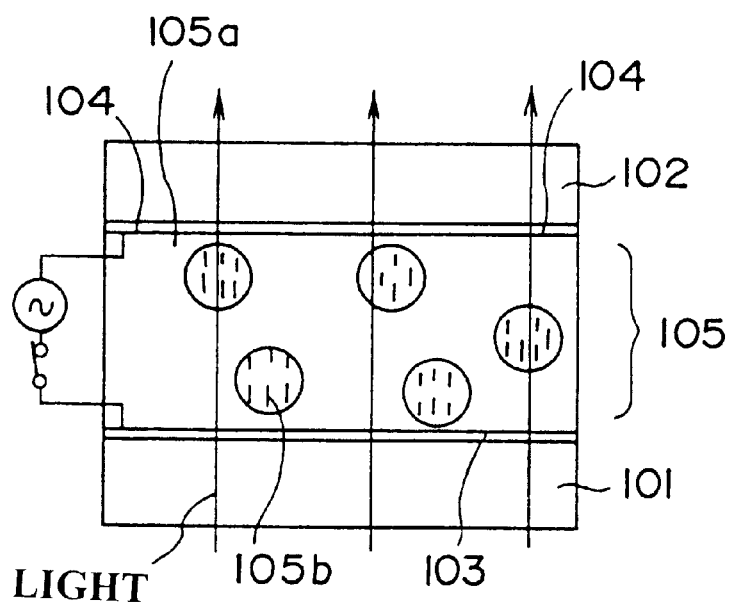
Figure 2A:
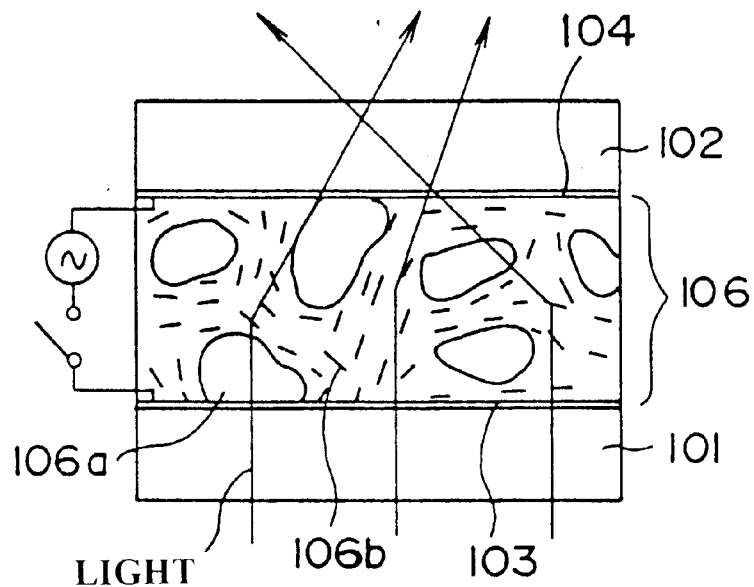
FIGS. 2A and 2B are cross sectional views showing the structures of another prior art liquid crystal display panels.
Figure 2B:
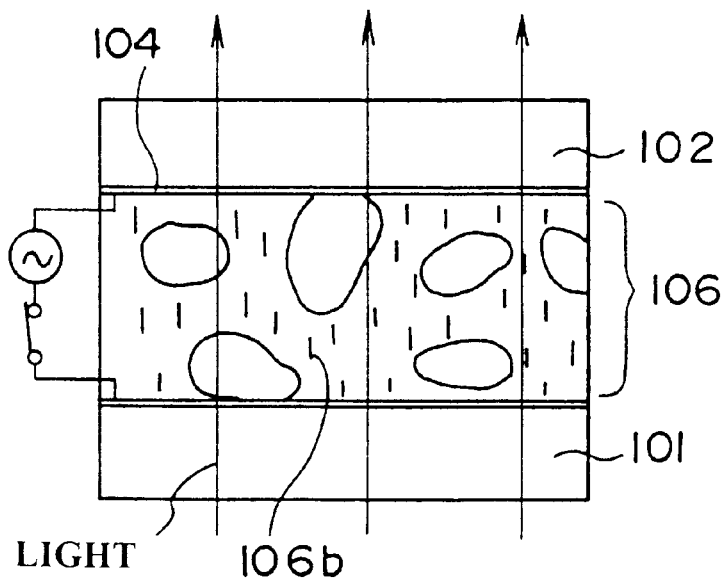

FIGS. 3A and 3B and FIGS. 4A and 4B show the characteristic feature of the present invention in which buffer layers are formed by adding a dispersing agent and interposed between a liquid crystal material and a polymer matrix.

In FIGS. 3A and 3B and FIGS. 4A and 4B, transparent conductive layers 3 and 4 are formed on the opposed inside surfaces of a first transparent substrate 1 and a second transparent substrate 2 respectively. Polymer dispersed liquid crystal layers 5 and 6 are interposed between the transparent conductive layers 3 and 4. In the figures, the transparent conductive layer 3 is formed, for example, from ITO (indium tin oxide) and serves as pixel electrodes connected to the source electrode 7h the thin film transistor 7 functioning as active elements. The thin film transistor 7 comprises an active semiconductor layer 7a made of silicon, a gate insulating film 7b and a gate electrode 7c stacked in this order. A drain region 7d and a source region 7e are located in the both sides of the active semiconductor layer 7a. This thin film transistor 7 is covered by an insulating film 7f with the source electrode 7h connected to the source region 7e through a contact hole and a drain electrode 7g connected to a drain bus line (not shown in the figure) and the drain region 7d through the other contact hole. Of course, the thin film transistor 7 and the transparent conductive layer 3 are coupled as a pair located in each pixel of the matrix of the screen. For example, 800×600 pairs are formed on the substrate 1.

Figure 3A:
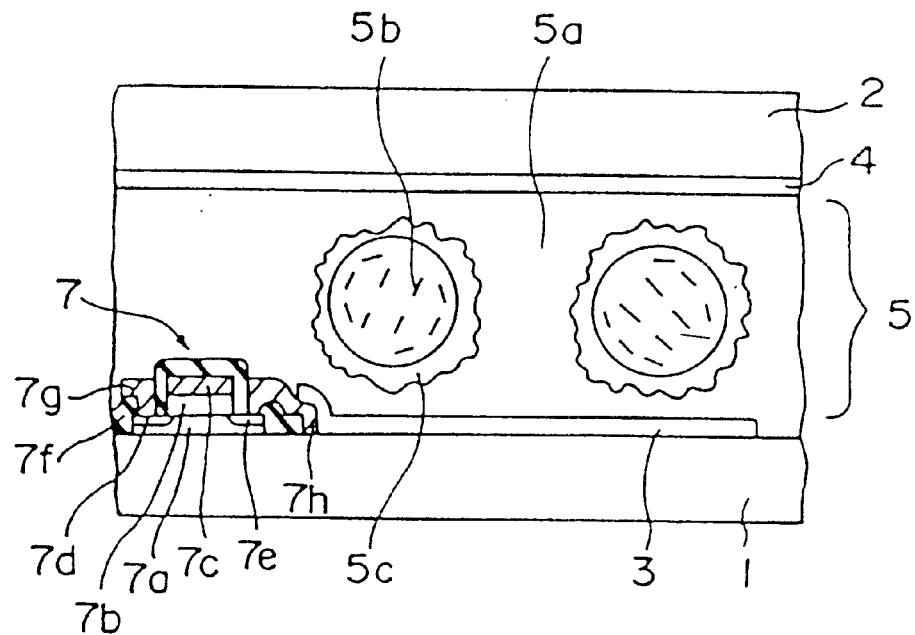
FIGS. 3A and 3B are cross sectional views showing a first example of the liquid crystal display panel in accordance with the present invention in which buffer layers made of a dispersing agent are interposed between liquid crystal droplets and a polymer matrix layer.
Figure 3B:
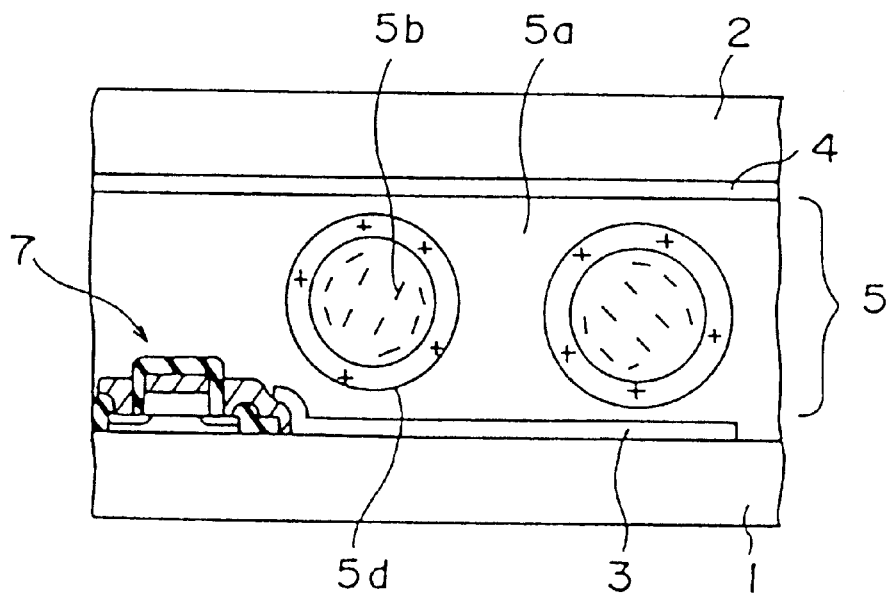

The polymer dispersed liquid crystal layer 5 as illustrated in FIGS. 3A and 3B is composed of a polymer matrix layer 5a in which is dispersed by phase separation a number of liquid crystal droplets 5b which are approximately spherical. Buffer layers 5c and 5d are interposed between the liquid crystal droplets 5b and the polymer matrix layer 5a.

Figure 4A:
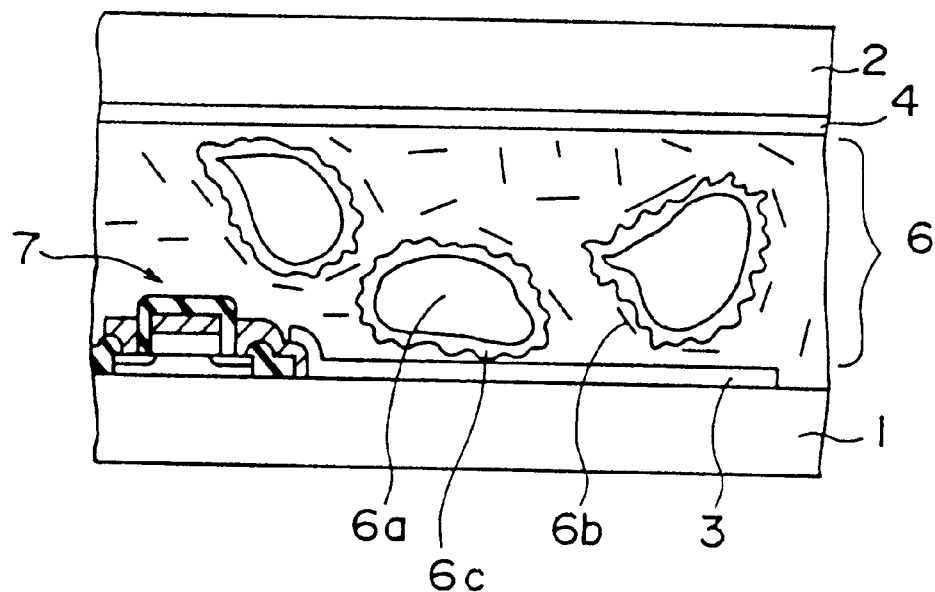
FIGS. 4A and 4B are cross sectional views showing a second example of the liquid crystal display panel in accordance with the present invention in which buffer layers made of a dispersing agent are interposed between a liquid crystal material and a polymer matrix layer.
Figure 4B:
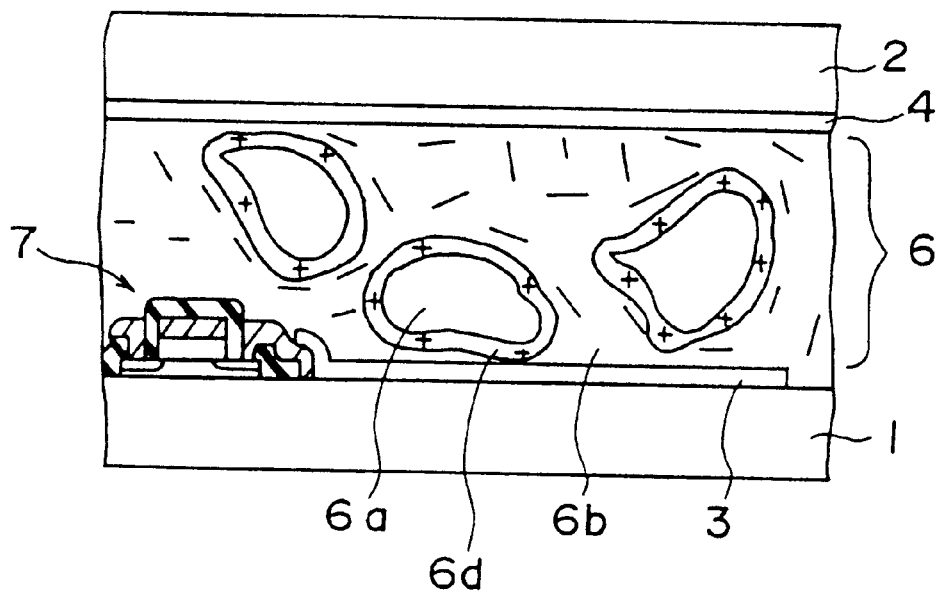

On the other hand, the polymer dispersed liquid crystal layer 5 as illustrated in FIGS. 4A and 4B is composed of a polymer matrix 6a in the form of fine particles dispersed in a liquid crystal layer 6b. Buffer layers 6c and 6d are interposed between the liquid crystal droplets 6b and the polymer matrix layer 6a also in this case.

The buffer layers 5c and 6c as illustrated in FIGS. 3A and 4A are composed of a polymer and serve as a stereoblocking thick layer having a dispersion effect.

The buffer layers 5d and 6d as illustrated in FIGS. 3B and 4B are composed of a cationic dispersing agent having an electrostatic effect and locally charged with positive electrostatic charge.

The buffer layers 5c, 6c, 5d and 6d are formed of a dispersing agent as described later and serve to lessen the interaction between the liquid crystal and the polymer matrix by the effect of the stereochemical structure and the electrostatic effect. The interaction between the liquid crystal and the polymer matrix originates from the difference in the thermal expansion coefficient, the anchoring energy (control energy for orienting direction) by the polymer matrix and so forth which causes the hysteresis effect on the curve showing the relationship between the transmittance and the voltage across the liquid crystal panel.

Figure 17:
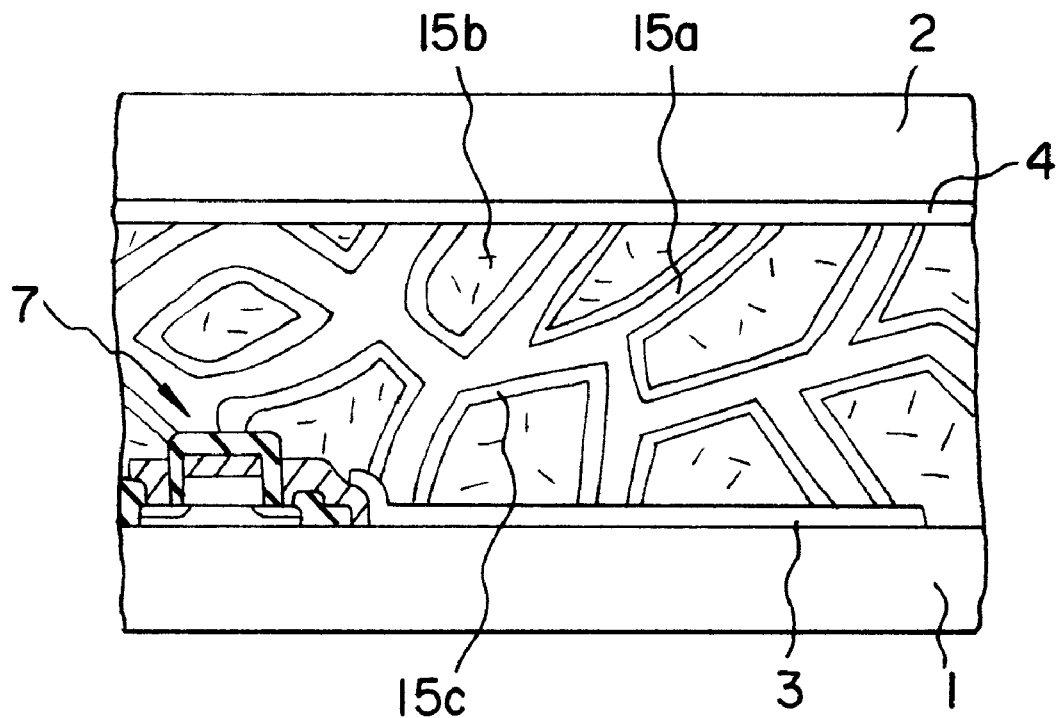
FIG. 17 is cross sectional view showing the other example of the polymer dispersed liquid crystal display panel having polymer network in accordance with the present invention.

As shown in FIG. 17, the present invention is also applied to the other type of polymer dispersed liquid crystal panel including a polymer network in which a liquid crystal material is dispersed as described in the reference [1]. A buffer layer 15C is formed between the liquid crystal 15b and the polymer matrix 15a also in this case.

A dispersing agent is composed of a polar group attracted by the liquid crystal or the polymer matrix and a lipophilic group alienated therefrom. Available dispersing agents include anionic dispersing agents, cationic dispersing agents, electrically neutral dispersing agents, bipolar dispersing agents, non-ionic dispersing agents, fluoric dispersing agents, polymer dispersing agents and other nonaqueous dispersing agents. Anionic dispersing agents includes polyether polyester carboxylates, polymer polyester acid polyamine salts, macromolecular weight polycarboxylic acid long chain amine salts and so forth. Cationic dispersing agents include aliphatic amine salts, fourth order ammonium salts and polyaminoamides and salts thereof. Electrically neutral dispersing agents include long chain polyaminoamide and macromolecular weight polyesterate compounds. Amphoteric dispersing agents include a material having amphoteric of a cation and an anion within the same molecules. Non-ionic dispersing agents include polyoxyethylenealkylether and sorbitan ester. Fluorine base dispersing agents include Fluorade F-431 produced by Sumitomo Three M's Ltd. and Megafac F-173 produced by Dainippon Ink Ltd.. Polymer dispersing agents include polymer resins having molecular weights of 3000 to 100000 such as polyurethane, acrylic, polyester and so forth. Also, polymer dispersing agents include a series of the Disperbyk-160 products produced by BYK Chemie Ltd., the Disperon #703 produced by KUSUMOTO KASEI Ltd., the solsperse #24000 produced by ICI Ltd. and so forth.

Meanwhile, the liquid crystal layers and droplets used in accordance with the present invention are not limited to the above described examples but can be selected from those well-known in the art. The liquid crystal materials might comprise other elements if necessary. When the above described polymer dispersed liquid crystals are utilized to form reflection-type liquid crystal panels, the substrate carrying the pixel electrodes may not be transparent while reflection surfaces are provided inside thereof.

In accordance with experiments, it was confirmed that the width of hystresis loop can be reduced by interposing buffer layers between the liquid crystal and the polymer matrix as described above. The details of the experiments will be explained hereinbelow.

FIRST EXAMPLE

In this experiment, TL202 produced by Merck Ltd. was used as a liquid crystal material. Also, epoxyacrylate-system base oligomer produced by NIPPON KAYAKU Ltd. diluted by 2-ethylhexylacrylate produced by NIPPON KAYAKU Ltd. was employed as a ultraviolet curing resin for forming a polymer matrix. A photo-polymerization initiater made of Iruga Cure 184 produced by Ciba Geigy Ltd. was added to the ultraviolet curing resin to a proportion of 2 wt % of the resin by weight. The ultraviolet curing resin is called as the resin A hereinafter.

Figure 5A:
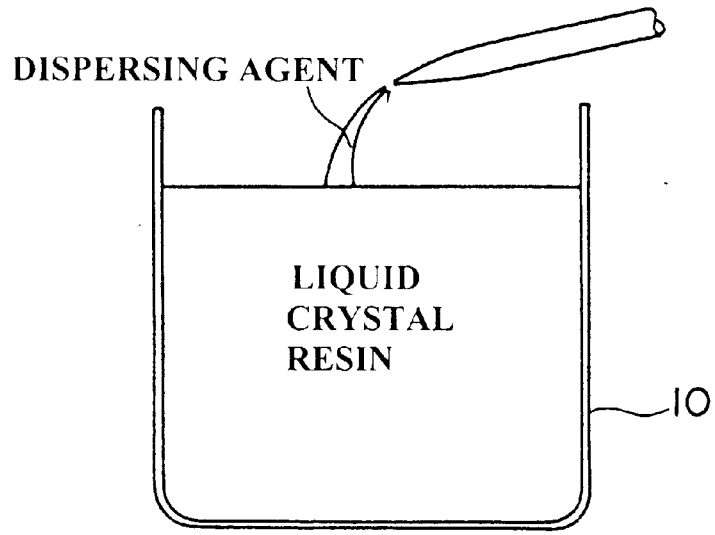
FIG. 5A is an explanatory view illustrating the procedure for preparing a mixture of a dispersing agent, a liquid crystal and a polymer matrix in accordance with the present invention.

The liquid crystal and the resin A were mixed in a vessel 10 as illustrated in FIG. 5A at a ratio of 75:25 by weight in order to form a premixture. A dispersing agent equivalent to 10 wt % of the resin A by weight was added to the premixture to form a mixture in the vessel 10. The dispersing agent was Disperbyk 161 produced by BYK Chemie Ltd.

Figure 5B:
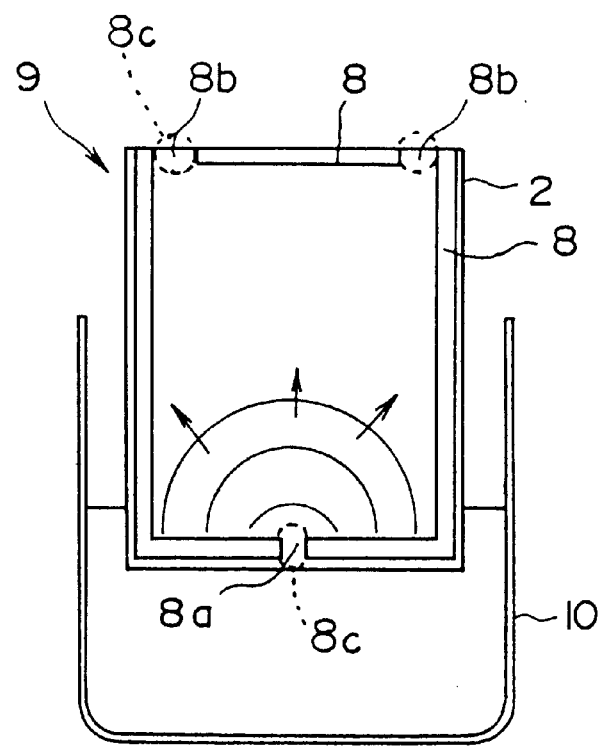
FIG. 5B is an explanatory view illustrating the procedure for filling a vacant panel with the mixture.

On the other hand, a sealing member 8 made of ultraviolet-curing resin is coated at the periphery of a second substrate 2 to form a frame with openings 8a and 8b at the both short sides thereof as illustrated in FIG. 5B. The opening 8a of the liquid crystal panel 9 was then dipped into the mixture in the vessel 10 so that the mixture was elevated through the opening 8a of the liquid crystal panel 9 by capillarity to fill the inside of the liquid crystal panel 9. After completely filling the liquid crystal panel 9, the openings 8a and 8b were closed by a sealing member 8c made of a resin curable by visible light.

The sealing member 8c was then hardened by illumination of visible light. The liquid crystal, the resin A and the dispersing agent were therefore prevented from being leaked from the liquid crystal panel 9 even if the liquid crystal panel 9 was subjected to high frequency vibration and cleaning in a solvent. Meanwhile, when the ultraviolet-curing resin is made of a resin which is not easily volatilized even in a reduced pressure, the liquid crystal panel 9 might be filled with the mixture by the vacuum filling technique, the dripping technique or the like utilizing a vacuum atmosphere.

Next, the liquid crystal, the resin A and the dispersing agent between the transparent conductive layers 3 and 4 were then exposed to ultraviolet light to cure the resin A by photo-polymerization as illustrated in FIGS. 3A and 3B and FIGS. 4A and 4B. The strength of the ultraviolet light was for example 30 mW/cm² and the exposure time was for example 5 minutes.

The liquid crystal and the resin A were phase separated by the curing of the resin A with intervening layers of the dispersing agent therebetween. The resin A thus cured formed the polymer matrix 5a and 6a. The liquid crystal panels as illustrated in FIGS. 3A and 3B and FIGS. 4A and 4B were then completed. The sealing member 8 was also cured at the same time. The sealing member 8 is not necessarily made from a ultraviolet-curing resin.

Figure 6:
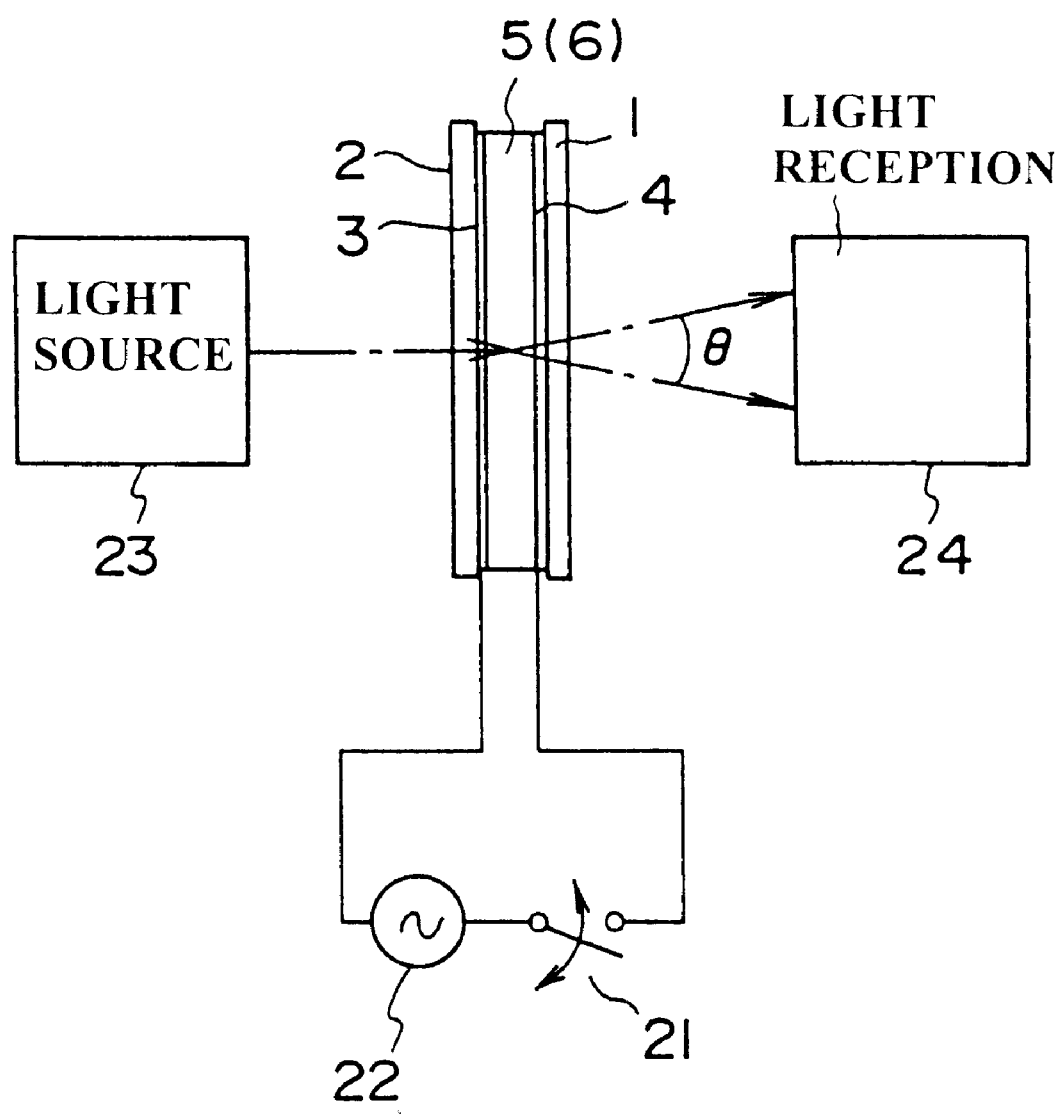
FIG. 6 is a schematic diagram showing a system designed for examining the relationship between the transmittance and the voltage applied to the liquid crystal panel.

A hysteresis effect was confirmed as illustrated in FIG. 7 by measuring the transmittance of the liquid crystal panel with respect to the applied voltage thereof by means of the system as illustrated in FIG. 6. The system comprises an alternating voltage source 22 to be connected to the transparent conductive layers 3 and 4 of the liquid crystal panel through a changeover switch 21, a light source 23 for illuminating the second substrate 2, a light reception device 24 for receiving light passing through the liquid crystal panel and an arithmetic operation device (not shown in the figure) for obtaining the ratio of the intensity of the light passing through the liquid crystal panel to the intensity of the light incident into the liquid crystal panel. The angle θ in the figure was the collection cone angle within which light could be received by the light reception device 24. The angle θ was 10 degrees in this experiment.

The respective values relating to the hysteresis are given references hereinbelow, for the purpose of explanation, in conjunction with by the characteristic curve representing the transmittance of the liquid crystal panel with respect to the applied voltage. TO stands for the transmittance of the liquid crystal panel when the voltage applied between the transparent conductive layers 3 and 4 was zero. $T_{100}$ stands for the transmittance of the liquid crystal panel when the voltage between the transparent conductive layers 3 and 4 was increased until the transmittance was saturated. $T_{10}$ stands for 10% of $T_{100}$. Vth stands for the voltage applied between the transparent conductive layers 3 and 4 when the transmittance of the liquid crystal panel was $T_{10}$. $T_{90}$ stands for 90% of $T_{100}$. $V_{sat}$ stands for the voltage applied between the transparent conductive layers 3 and 4 when the transmittance of the liquid crystal panel was $T_{90}$. $T_{50}$ stands for the midpoint between $T_0$ and $T_{100}$. Namely, $T_{50}=(T_{100}-T_0)/2$.

On the other hand, $T_{50}$ takes two values on the hysteresis loop. $T_{50}(UP)$ stands for the transmittance when the voltage applied was increased from zero while $T_{50}(DOWN)$ stands for the transmittance when the voltage applied was decreased from the voltage causing the saturation. $\Delta H_{50}$ is defined to represent the difference between the voltages $V_{50}(UP)$ and $V_{50}(DOWN)$ when the transmittance was $T_{50}(UP)$ and $T_{50}(DOWN)$.

$$\Delta H_{50}=V_{50}(UP)-V_{50}(DOWN)$$

A smaller value of $\Delta H_{50}$ represents a weaker hysteresis effect. The voltages applied are described as the effective values herein. The $\Delta H_{50}$ hysteresis can be read out from FIG. 7 to be 0.064V.

Contrary to this, when a similar experiment was conducted by repeating the above procedure while the dispersing agent was dispensed with to plot FIG. 8 corresponding to FIG. 7, the $\Delta H_{50}$ hysteresis can be read out to be 0.4V from FIG. 8.

It will be understood from the above description that the hysteresis effect can be substantially reduced by utilizing a polymer dispersed liquid crystal panel to which a dispersing agent is added.

Figure 11:
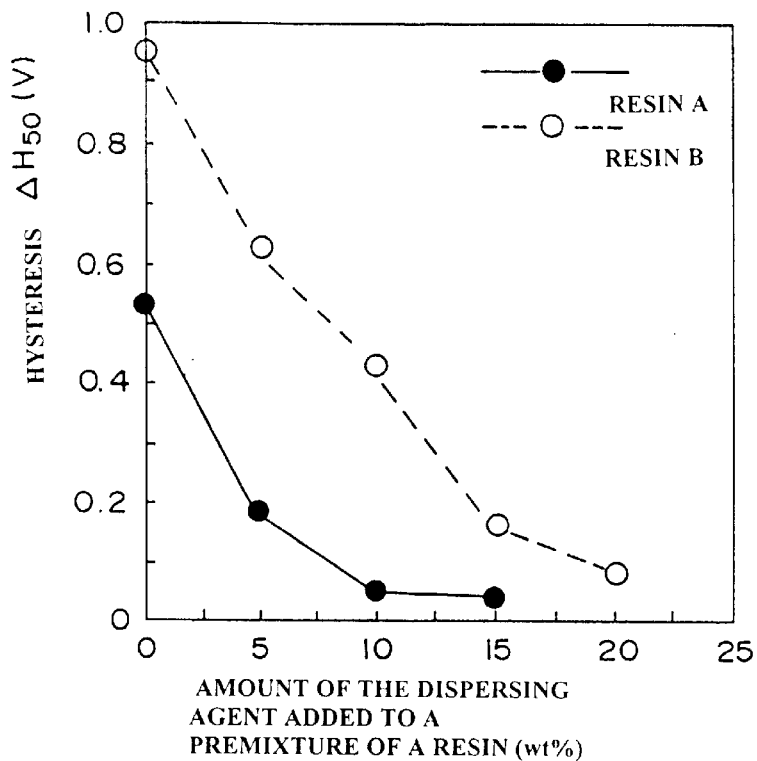
FIG. 11 is a graphic diagram showing a first example of the relationship between the width of the hysteresis loop of the transmittance of the liquid crystal panel and the applied voltage thereof and the amount of a dispersing agent added to a resin.

Next, the relationship between the amount of the dispersing agent added and the $\Delta H_{50}$ hysteresis was examined. As a result, the graphic diagram as illustrated in FIG. 11 was plotted. The amount of the diffusing agent is shown in the unit of weight % with the amount of the resin A being 100% wt. As seen from FIG. 11, the $\Delta H_{50}$ hysteresis was reduced as the amount of the dispersing agent increased, resulting in improvement of the characteristics.

Also, it was examined how the dispersing agent influences the temperature at which the liquid crystal and the resin A are phase separated in advance of exposure to ultraviolet light. If the liquid crystal and the resin A are phase separated in advance of exposure to ultraviolet light, the threshold voltage and the saturation voltage are increased so that the scattering ability with no voltage across the liquid crystal panel is lessened resulting in a lower contrast.

Figure 12:
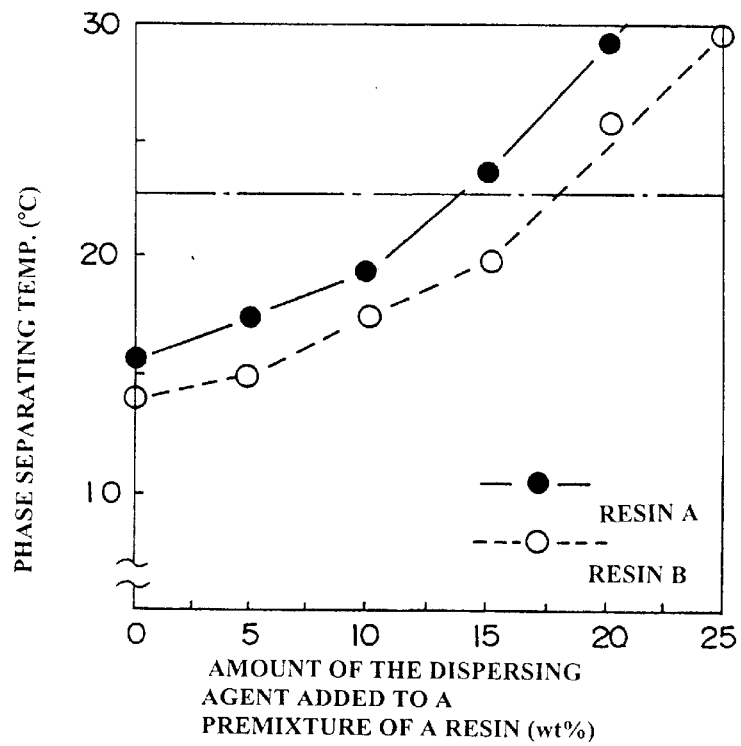
FIG. 12 is a graphic diagram showing the relationship between the amount of the dispersing agent added to a resin and the temperature at which the liquid crystal and the resin are phase separated.

FIG. 12 is a graphical diagram showing the relationship between the dispersing agent and the temperature at which the liquid crystal and the resin A are phase separated. It will be understood from this diagram that the temperature of phase separation is elevated as the amount of the dispersing agent is increased.

Polymer dispersed liquid crystals have to be prepared at temperatures higher than the temperature of phase separation. Since the preparation of a polymer dispersed liquid crystal is usually carried out at room temperature, the dispersing agent must be added in order that the temperature of phase separation is lower than room temperature. If the room temperature is assumed to be 23° C., the proportion of the dispersing agent is preferably no higher than 15 wt % by weight with the amount of the resin A being 100 wt %.

Figure 13:
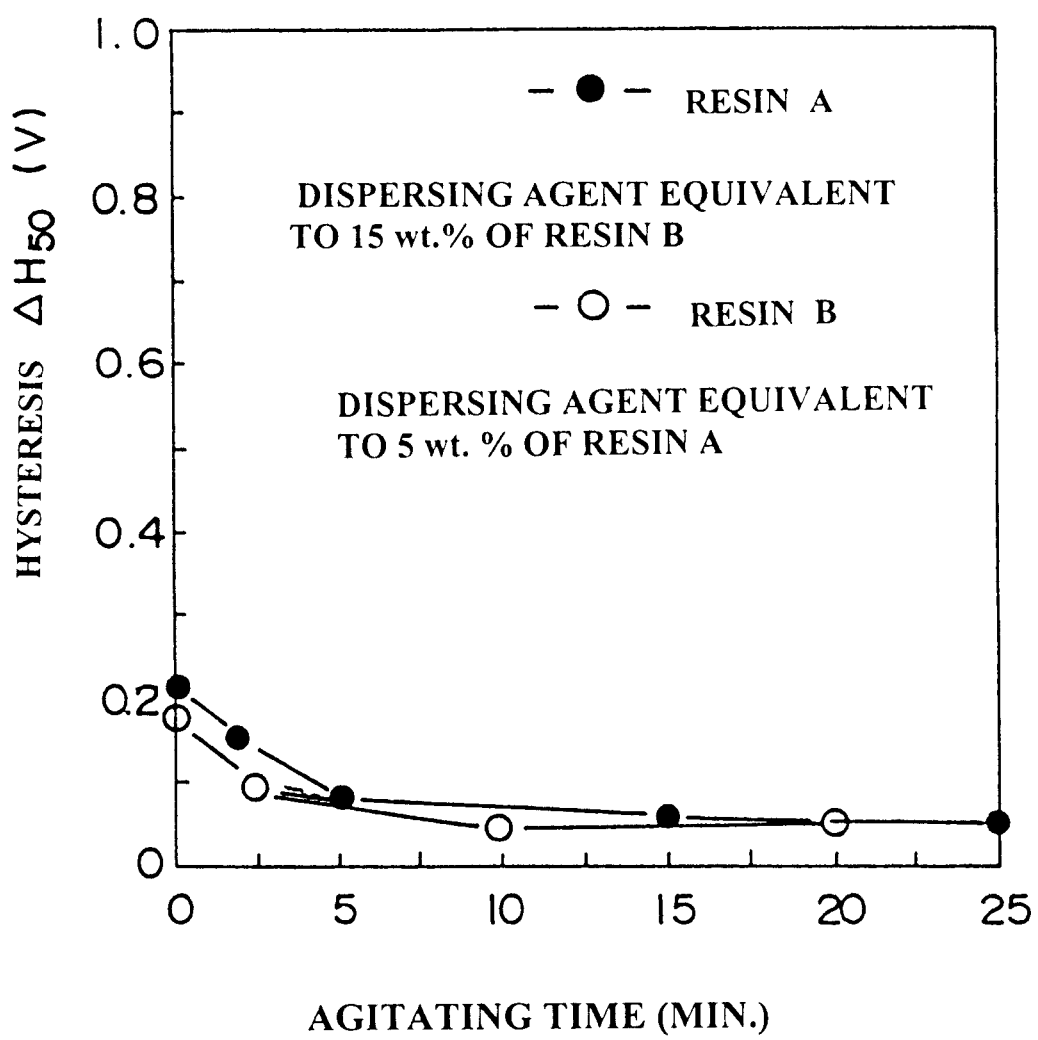
FIG. 13 is a graphic diagram showing the relationship between the width of the hysteresis loop of the transmittance of the liquid crystal panel and the applied voltage thereof and the agitation time of a resin and a liquid crystal with an additive of a dispersing agent.

Next, after the dispersing agent is added to the premixture to prepare a mixture, the mixture is agitated by vibration externally applied thereto. The relationship between the agitation time by ultrasonic vibrations and the $\Delta H_{50}$ hysteresis was examined. As a result, the graphic diagram as illustrated in FIG. 13 was plotted. As seen from the diagram, in the case of the mixture containing the resin A, the $\Delta H_{50}$ hysteresis was reduced as the agitation time was increased as long as the agitation time did not exceed 10 minutes. However, even if the agitation time was further increased from 10 minutes, the $\Delta H_{50}$ hysteresis was substantially not reduced.

The $\Delta H_{50}$ hysteresis in the case that agitation was dispensed with was compared with the $\Delta H_{50}$ hysteresis in the case that agitation was carried out for 10 minutes while the amount of the dispersing agent was 5 wt % of the weight of the resin A for both cases. As a result, the graphic diagram as illustrated in FIGS. 9 and 10 was plotted. Not only the $\Delta H_{50}$ hysteresis was suppressed, but also the elevating curve and the descending curve of the hysteresis loop have substantially approached to each other resulting in improvement of characteristics. If the temperature of phase separation is elevated by a relative much amount of the dispersing agent added, it is preferred to agitate the mixture by externally applied vibration in advance of the exposure to ultraviolet light to lower the threshold voltage and the saturation voltage.

Meanwhile, the dispersing agent as described above contains polyurethane (28 wt %) diluted by butyl acetate (10 wt %) and 1-methoxy (62 wt %). The polyurethane comprises polycapro lactone at (55 wt %=49 mol %), polyethylene glycol (14 wt %=32 mol %), tolylene diisocyanate at (21 wt %=12 mol %) and decyl alcohol (10 wt %=7 mol %).

SECOND EXAMPLE

In this experiment, TL202 produced by Merck Ltd. was used as a liquid crystal material. Also, urethane acrylate base oligomer produced by NIPPON KAYAKU diluted by 2-ethylhexyl acrylate produced by NIPPON KAYAKU Ltd. was employed as a ultraviolet-curing resin for forming a polymer matrix. A photo-polymerization initiater made of Iruga Cure 184 was added to the ultraviolet-curing resin to 2 wt % of the resin by weight. The ultraviolet-curing resin is called as the resin B hereinafter.

The liquid crystal and the resin B were mixed at a ratio of 75:25 by weight in order to form a premixture. A diffusing agent equivalent to 10 wt % of the resin B was added to the premixture to form a mixture in the vessel 10. The diffusing agent was Disperbyk 161.

The mixture was then disposed between the first and second substrates 1 and 2 by capillarity to fill the inside of the liquid crystal panel 9.

Next, the mixture located between the transparent conductive layers 3 and 4 was then exposed to ultraviolet light to cure the resin B. The strength of the ultraviolet light was, for example, 30 mW/cm$^2$ and the exposure time was for example 5 minutes.

The resin B is cured by the ultraviolet light. However, The dispersing agent was not cured by the ultraviolet light and located between the resin B and the liquid crystal. The resin B thus cured formed the polymer matrix 5a and 6a. The liquid crystal panels as illustrated in FIGS. 3A and 3B and FIGS. 4A and 4B were then completed.

Figure 14:
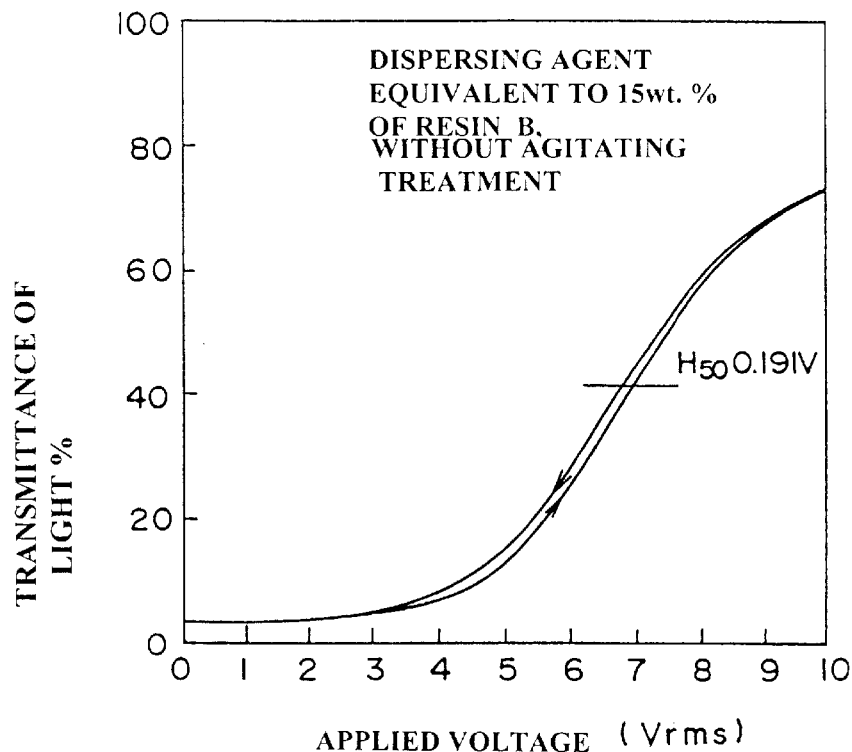
FIG. 14 is a graphic diagram showing a second example of the relationship between the transmittance and the applied voltage in the case of a polymer dispersed liquid crystal display panel utilizing a dispersing agent.

A hysteresis effect was confirmed as illustrated in FIG. 14 by measuring the transmittance of the liquid crystal panel with respect to the applied voltage thereof by means of the system as illustrated in FIG. 6. The $\Delta H_{50}$ hysteresis can be read out from FIG. 14 to be 0.191V.

Figure 15:
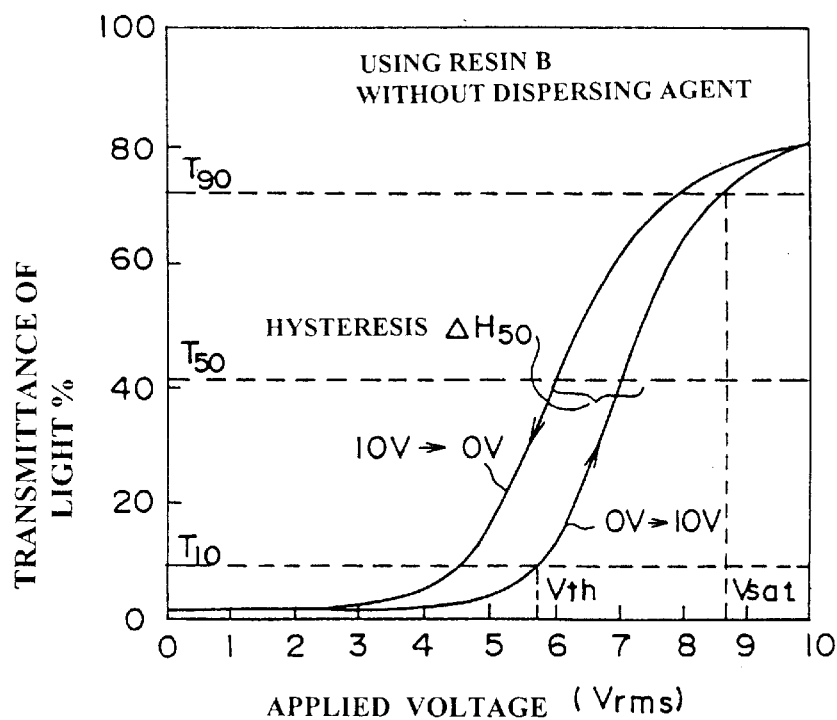
FIG. 15 is a graphic diagram showing a second example of the relationship between the transmittance and the applied voltage in the case of a conventional polymer dispersed liquid crystal display panel in which no dispersing agent is utilized.

Contrary to this, when a similar experiment was conducted by repeating the above procedure while the dispersing agent was dispensed with to plot FIG. 15 corresponding to FIG. 14, the $\Delta H_{50}$ hysteresis can be read out to be 1 V from FIG. 15.

It will be understood from the above description that the hysteresis effect can be substantially reduced by utilizing a polymer dispersed liquid crystal panel to which a dispersing agent is added.

Next, the relationship between the amount of the dispersing agent added and the $\Delta H_{50}$ hysteresis was examined in the case utilizing the resin B. As a result, the graphic diagram as illustrated in FIG. 11 was plotted.

As seen from the figure, the $\Delta H_{50}$ hysteresis was reduced as the amount of the dispersing agent increased, resulting in improvement of the characteristics. It is also found by comparing the cases utilizing the resin A and the resin B that the $\Delta H_{50}$ hysteresis in the latter case was larger than that in the former case while the $\Delta H_{50}$ hysteresis was improved by adding the dispersing agent in either case. From this fact, it will be understood that the effect of adding the dispersing agent is independent from the material of the polymer matrix. This is also the case with respect to what liquid crystal material is utilized.

It was examined how the dispersing agent influences the temperature at which the liquid crystal and the resin B are phase separated in advance of exposure to ultraviolet light. FIG. 12 is a graphical diagram showing the relationship between the dispersing agent and the temperature at which the liquid crystal and the resin B are phase separated. It will be understood from this diagram that the temperature of phase separation is elevated as the amount of the dispersing agent is increased. Polymer dispersed liquid crystals have to be prepared at temperatures higher than the temperature of phase separation while the preparation of a polymer dispersed liquid crystal is usually carried out at room temperature. If the room temperature is assumed to be 23° C., the proportion of the dispersing agent is therefore preferably no higher than 18 wt % by weight with the amount of the resin B being 100 wt %.

Next, after the dispersing agent is added to the first premixture to prepare a mixture, the mixture is agitated by vibration externally applied thereto. The relationship between the agitation time and the $\Delta H_{50}$ hysteresis was examined. As a result, the graphic diagram as illustrated in FIG. 13 was plotted. As seen from the diagram, the $\Delta H_{50}$ hysteresis was reduced as the agitation time was increased as long as the agitation time did not exceed 10 minutes. However, even if the agitation time was further increased from 10 minutes, the $\Delta_{H50}$ hysteresis was substantially not reduced.

Figure 16:
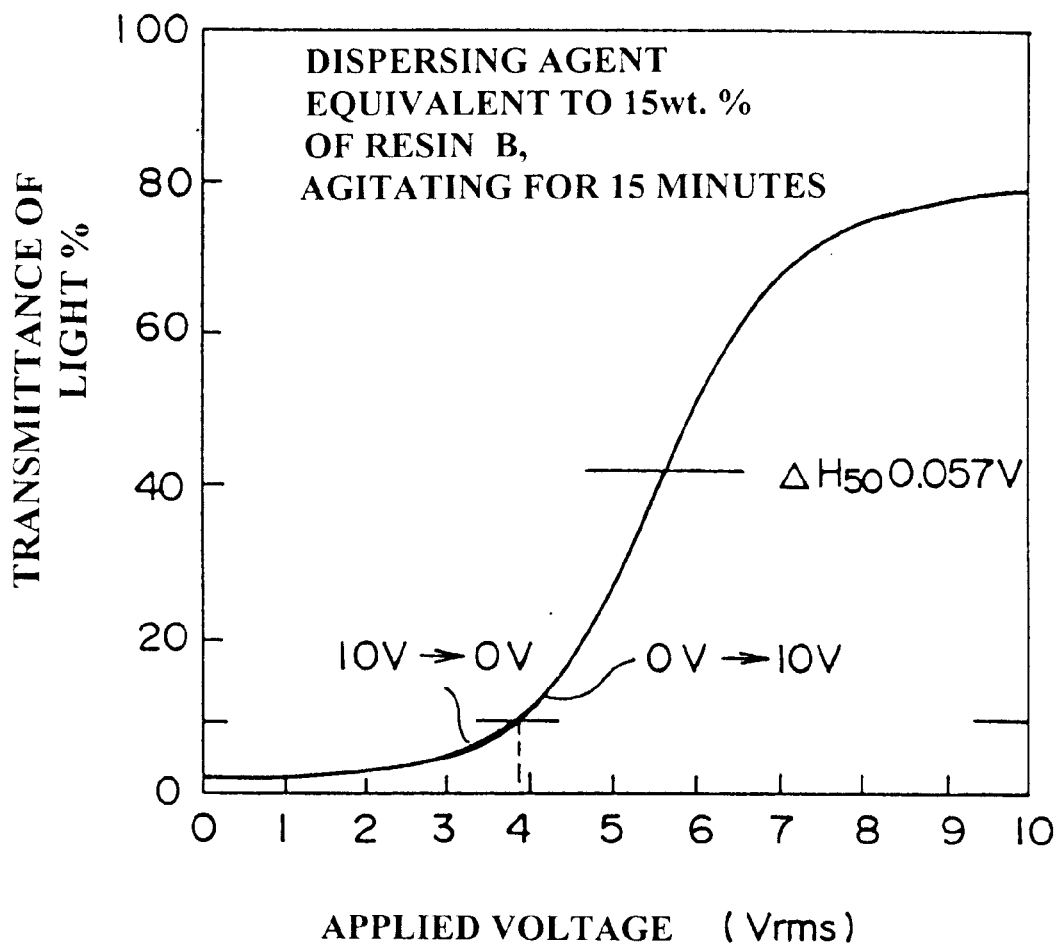
FIG. 16 is a graphic diagram showing the second example of the relationship between the transmittance of the liquid crystal panel and the applied voltage thereof in the case that a premixture with an additive of a dispersing agent is agitated in accordance with the present invention.

The $\Delta H_{50}$ hysteresis in the case that agitation was dispensed with was compared with the $\Delta H_{50}$ hysteresis in the case that agitation was carried out for 15 minutes while the amount of the dispersing agent was 15% of the weight of the resin A for both cases. As a result, the graphic diagram showing the hysteresis loop as illustrated in FIG. 16 was plotted. Not only the $\Delta H_{50}$ hysteresis was suppressed as compared with FIG. 14, but also the elevating curve and the descending curve of the hysteresis loop have substantially approached to each other resulting in improvement of characteristics.

In either case utilizing the resin A or the resin B, the hysteresis effect could be lessened without substantially deteriorating the threshold voltage and the saturation voltage by adding the diffusing agent up to 30 wt % as long as agitation was carried out.

The materials of the liquid crystal and the polymer matrix are not limited to the above examples.

Available liquid crystal materials include TL205, TL213, E8 and ZLI-4792 produced by Merck Ltd, and RDP-20312, $FT_{100}8XX$ and $FT_{100}9XX$ produced by Chisso Ltd..

Available polymer matrices include urethane base acrylates produced by NIPPON KAYAKU Ltd., epoxy base acrylates utilizing MPL203 as a monomer and DL-6 produced by Nagase Ciba Ltd., and PNS93 produced by Merck Ltd. and so forth.

What is claimed is:

1. A method of manufacturing a polymer dispersed liquid crystal display device comprising the steps of:

disposing a mixture between a pair of substrates, said mixture being prepared by adding a dispersing agent to a premixture of a liquid crystal and a ultraviolet-curing polymer matrix;

agitating said mixture between the pair of said substrates by giving vibrations; and irradiating said mixture with ultraviolet light to phase separate said liquid crystal, said ultraviolet-curing polymer matrix and said dispersing agent and to cure said ultraviolet-curing polymer matrix.

2. The method of manufacturing a polymer dispersed liquid crystal display device as claimed in claim 1 wherein said mixture is disposed in a frame made of a ultraviolet-curing sealing material provided between said pair of substrates, said ultraviolet-curing sealing material is cured in the phase separating step.

3. The method of manufacturing a polymer dispersed liquid crystal display device as claimed in claim 1 wherein said frame made of the ultraviolet-curing sealing material is provided with at least two openings which have been closed by visible light-curable sealing material in a condition that said mixture is disposed in said frame, wherein said visible light-curable sealing material is cured by visible light in advance of the phase separating step.

4. The method of manufacturing a polymer dispersed liquid crystal display device as claimed in claim 1 wherein said anionic dispersing agent is selected from the group consisting of polyether polyester carboxylates, polymer polyester acid polyamine salts and macromolecular weight polycarboxylic acid long chain amine salts.

5. The method of manufacturing a polymer dispersed liquid crystal display device as claimed in claim 1 wherein said cationic dispersing agent is selected from the group consisting of aliphatic amines, fourth order amonium salts and polyaminoamide and salts thereof.

6. The method of manufacturing a polymer dispersed liquid crystal display device as claimed in claim 1 wherein said electrically neutral dispersing agent is selected from the group consisting of long chain polyaminoamide and salts of a polymer polyester acid.

7. The method of manufacturing a polymer dispersed liquid crystal display device as claimed in claim 1 wherein said bipolar dispersing agent is selected from the group consisting of those possessing both a cation and an anion within the same molecule.

8. The method of manufacturing a polymer dispersed liquid crystal display device as claimed in claim 1 wherein said non-ionic dispersing agent is selected from the group consisting of polyoxyethylenealkylether and sorbitan ester.

9. The method of manufacturing a polymer dispersed liquid crystal display device as claimed in a claim 1 wherein said polymer dispersing agent is selected from the group consisting of polymer resins having molecular weights of 3000 to 100000.

10. The method of manufacturing a polymer dispersed liquid crystal display device as claimed in claim 1 wherein said polymer matrix comprises a ultraviolet-cured resin.

11. The method of manufacturing a polymer dispersed liquid crystal display device as claimed in claim 10 wherein said ultraviolet-cured resin is epoxyacrylate oligomer diluted by 2-ethylhexyl acrylate.

12. The method of manufacturing a polymer dispersed liquid crystal display device as claimed in claim 1 wherein the proportion of said dispersing agent is up to 30 wt % of said polymer matrix.

13. The method of manufacturing a polymer dispersed liquid crystal display device as claimed in claim 1, wherein after irradiating said mixture with said ultraviolet light, said liquid crystal is dispersed in said ultraviolet-curing polymer matrix; and said dispersing agent forms in a layer at a boundary between said ultraviolet-curing polymer matrix and said liquid crystal.

14. The method of manufacturing a polymer dispersed liquid crystal display device as claimed in 1 wherein after said phase separating step, said dispersing agent forms in a layer at a boundary between said polymer matrix and said liquid crystal.

15. The method of manufacturing a polymer dispersed liquid crystal display device as claimed in claim 9, wherein said polymer resins are selected from the group consisting of polyurethane, acrylic, and polyester.

16. A method of manufacturing a polymer dispersed liquid crystal display device comprising the steps of:

disposing a mixture between a pair of substrates, said mixture being prepared by adding a dispersing agent to a premixture of a liquid crystal and a polymer matrix; and phase separating said liquid crystal, said polymer matrix and said dispersing agent by photo-polymerization between the pair of said substrates, wherein said dispersing agent is an anionic dispersing agent selected from the group consisting of polyether polyester carboxylates, polymer polyester acid polyamine salts and macromolecular weight polycarboxylic acid long chain amine salts.

17. A method of manufacturing a polymer dispersed liquid crystal display device comprising the steps of:

disposing a mixture between a pair of substrates, said mixture being prepared by adding a dispersing agent to a premixture of a liquid crystal and a polymer matrix; and phase separating said liquid crystal, said polymer matrix and said dispersing agent by photo-polymerization between the pair of said substrates.

wherein said dispersing agent is an electrically neutral dispersing agent selected from the group consisting of long chain polyaminoamide and salts of a polymer polyester acid.

18. A method of manufacturing a polymer dispersed liquid crystal display device comprising the steps of:

disposing a mixture between a pair of substrates, said mixture being prepared by adding a dispersing agent to a premixture of a liquid crystal and a polymer matrix; and phase separating said liquid crystal, said polymer matrix and said dispersing agent by photo-polymerization between the pair of said substrates.

wherein said dispersing agent is a bipolar dispersing agent selected from the group consisting of those possessing both a cation and an anion within the same molecule.

* * * * *